United States Patent [19]

Lowenstein et al.

[11] Patent Number: 5,319,513

[45] Date of Patent: Jun. 7, 1994

[54] HARMONIC MONITOR AND PROTECTION MODULE

[75] Inventors: Michael Z. Lowenstein, Mequon; Dean R. Mehlberg, Hales Corners, both of Wis.

[73] Assignee: Trans-Coil, Inc., Milwaukee, Wis.

[21] Appl. No.: 777,800

[22] Filed: Oct. 17, 1991

[51] Int. Cl.⁵ .............................................. H02H 9/04
[52] U.S. Cl. ........................................ 361/113; 361/36
[58] Field of Search ..................... 361/113, 111, 35, 36

[56] References Cited

U.S. PATENT DOCUMENTS

| | | | |
|---|---|---|---|
| 3,200,392 | 8/1965 | Chumakou. | |
| 4,142,151 | 2/1979 | Hansen. | |
| 4,419,660 | 12/1983 | Bergdahl | 361/113 |
| 4,470,091 | 9/1984 | Sun et al. | 361/113 |
| 4,477,854 | 10/1984 | Usui et al. | 361/36 |
| 4,590,533 | 5/1986 | Murata | 361/35 |
| 4,845,435 | 7/1989 | Bohan, Jr.. | |
| 4,967,334 | 10/1990 | Cook et al. | 363/34 |
| 4,972,153 | 11/1990 | Zucker et al.. | |

*Primary Examiner*—Todd DeBoer
*Attorney, Agent, or Firm*—Irving M. Weiner; Joseph P. Carrier; Pamela S. Burt

[57] ABSTRACT

A monitoring apparatus for a tuned harmonic filter is provided to prevent electrical system and filter damage. A tuned harmonic filter is provided in an electrical system to prevent overheating, motor damage, flickering lights, capacitor failure, etc. The present invention provides a sensing device in conjunction with the filter reactor to provide a signal indicative of the true operating condition of the filter. A monitoring circuit compares the signal with normal operating conditions of the filter to determine if a "fault" is occurring. Timing devices provide for a delay or rapid disconnection of the filter and/or electrical system. Indicator devices are provided to aid in diagnostic analysis of an electrical system. A remote indicator device may be included.

20 Claims, 2 Drawing Sheets

HARMONIC MONITOR AND PROTECTION MODULE

BACKGROUND OF THE INVENTION

1. Field of the Invention

The present invention relates to an apparatus for monitoring tuned harmonic filters, the apparatus being capable of disconnecting a filter from an electrical system to prevent damage to either the electrical system or the filter components. More particularly, the present invention comprises a monitor apparatus which is operatively connected to a filter device providing "clean" power to an electrical system. The monitor is adapted to compare the actual operating conditions of the filter with the preferred operating conditions of the filter and disconnect the filter and/or the electrical system when the monitor detects dangerous operating conditions.

A tuned harmonic filter is adapted to remove distortion caused by non-linear loads and protect sensitive equipment from damaging resonance conditions. Such a filter is designed to protect against motor cogging and damage, overheating transformers and wires, flickering lights, computer data loss, power capacitor failure, and power factor penalties. Since the consequences of the failure of such a filter may result in high repair costs, it is highly desirable to verify that the filter is operating within its designed parameters. The monitoring apparatus of the present invention is designed to monitor the operation of a filter and remove the filter and/or the electrical system from "on-line" if or when the filter does not meet its operating parameters, thus preventing damage to the filter and the electrical system.

2. Description of the Relevant Art

There are known devices which can be used to detect malfunctions or defects of electrical devices. Such previous devices have various shortcomings which the monitor apparatus of the present invention overcome.

U.S. Pat. No. 4,972,153 discloses an apparatus for detecting malfunctions in a group of electrical devices. The apparatus employs a current transformer for measuring energy levels in the electrical devices. However, a true indication of the power dissipation in a filter reactor is not taught by this device.

U.S. Pat. No. 4,845,435 discloses a sensor fault detector which utilizes a reference voltage and a plurality of comparators to produce a signal representative of properly operating sensors. However, this detector relies solely on voltage to indicate failure of the sensors.

U.S. Pat. No. 4,142,151 discloses a fault detector for diodes in an array of parallel diodes comprising heat-sensitive material that changes appearance when its temperature is raised. A resistor is situated such that it generates heat when a diode fails, causing the material to change color indicating a fault.

U.S. Pat. No. 3,200,392 discloses a circuit for counting the number of rectifier cell failures. Once a present number of failures is reached, the system is automatically shut off. A voltage pulse is generated each time there is a cell failure.

The above-discussed devices and other known monitoring instruments have various problems and shortcomings. These devices have failed to provide a monitoring apparatus associated with a harmonic filter including indicating means and means for removing the filter and its associated electrical system from "on-line" status.

SUMMARY OF THE INVENTION

The present invention provides a monitoring apparatus superior to the above-discussed devices and other known monitoring devices.

The present invention provides a monitoring apparatus adapted to observe the fundamental frequency and the harmonic frequencies to detect uncharacteristic conditions which could result in damage to the filter or electrical system. The present invention may suitably comprise, consist of, or consist essentially of sensing means, monitoring means, timing circuits, and tripping or disconnecting means. The sensing means is adapted to provide a signal indicative of the true operating condition of the filter being monitored.

Therefore, it is an object of the present invention to provide a monitoring apparatus which provides true three phase monitoring and comparison between phases.

It is a further object of the present invention to provide a monitoring apparatus sensitive to power dissipation in the filter reactor.

It is a further object of the present invention to provide a monitoring apparatus which monitors power dissipation at different frequencies.

It is a still further object of the present invention to provide a monitoring apparatus which provides a trip delay or rapid trip depending on the severity of the detected problem.

Yet another object of the present invention is to provide a monitoring apparatus which may be used as a diagnostic tool for "trouble-shooting".

The above and further objects, details and advantages of the invention will become apparent from the following detailed description, when read in conjunction with the accompanying drawings.

DETAILED DESCRIPTION OF THE PREFERRED EMBODIMENTS

Figure 1:
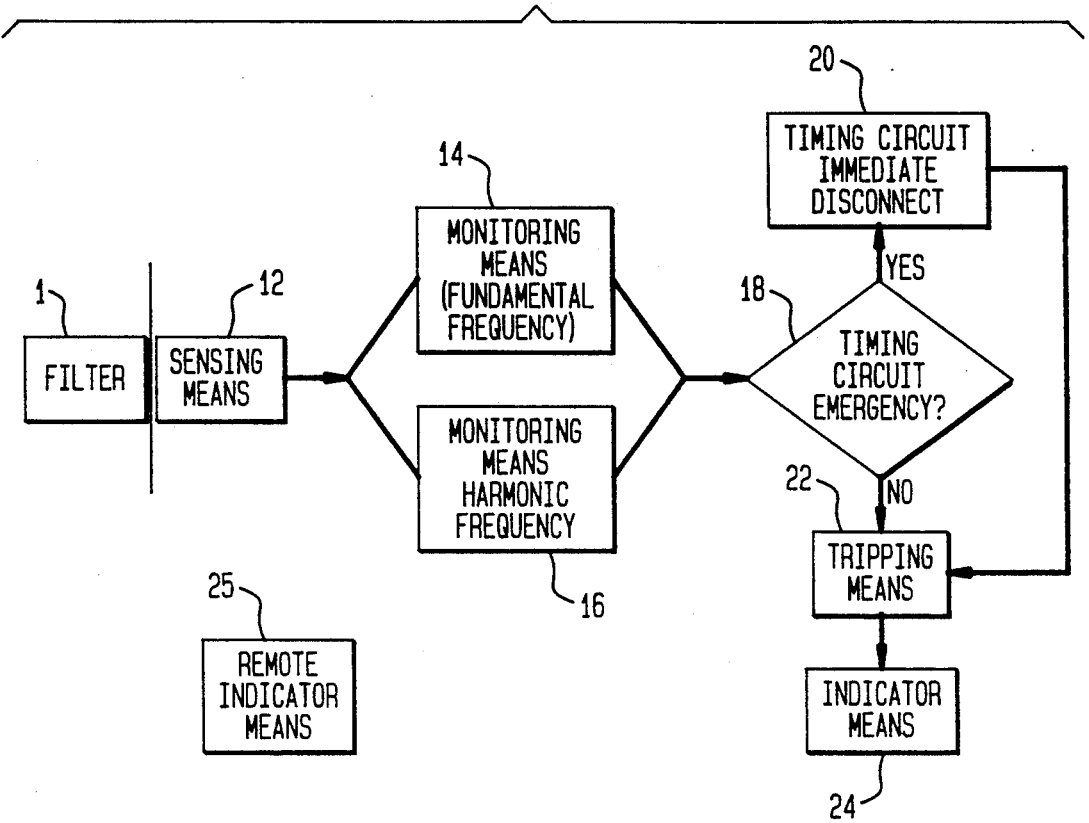
FIG. 1 illustrates a block diagram of a monitoring apparatus in accordance with the present invention connected to a filter.

Referring now to the drawings, and more particularly to FIG. 1 thereof, there is shown a block diagram 10 of an apparatus according to the present invention. A sensing means 12 generates a signal indicative of the actual operating condition of the harmonic filter 1. The sensing means 12 preferably comprises a coil or winding wound on the filter tuning reactor. Each coil of the filter tuning reactor includes its own sensing means 12 providing true three phase information with respect to the operation of the filter. Such a sensing means 12 also provides a measurement of the energy level (volt-seconds) of the filter reactor.

Figure 3:
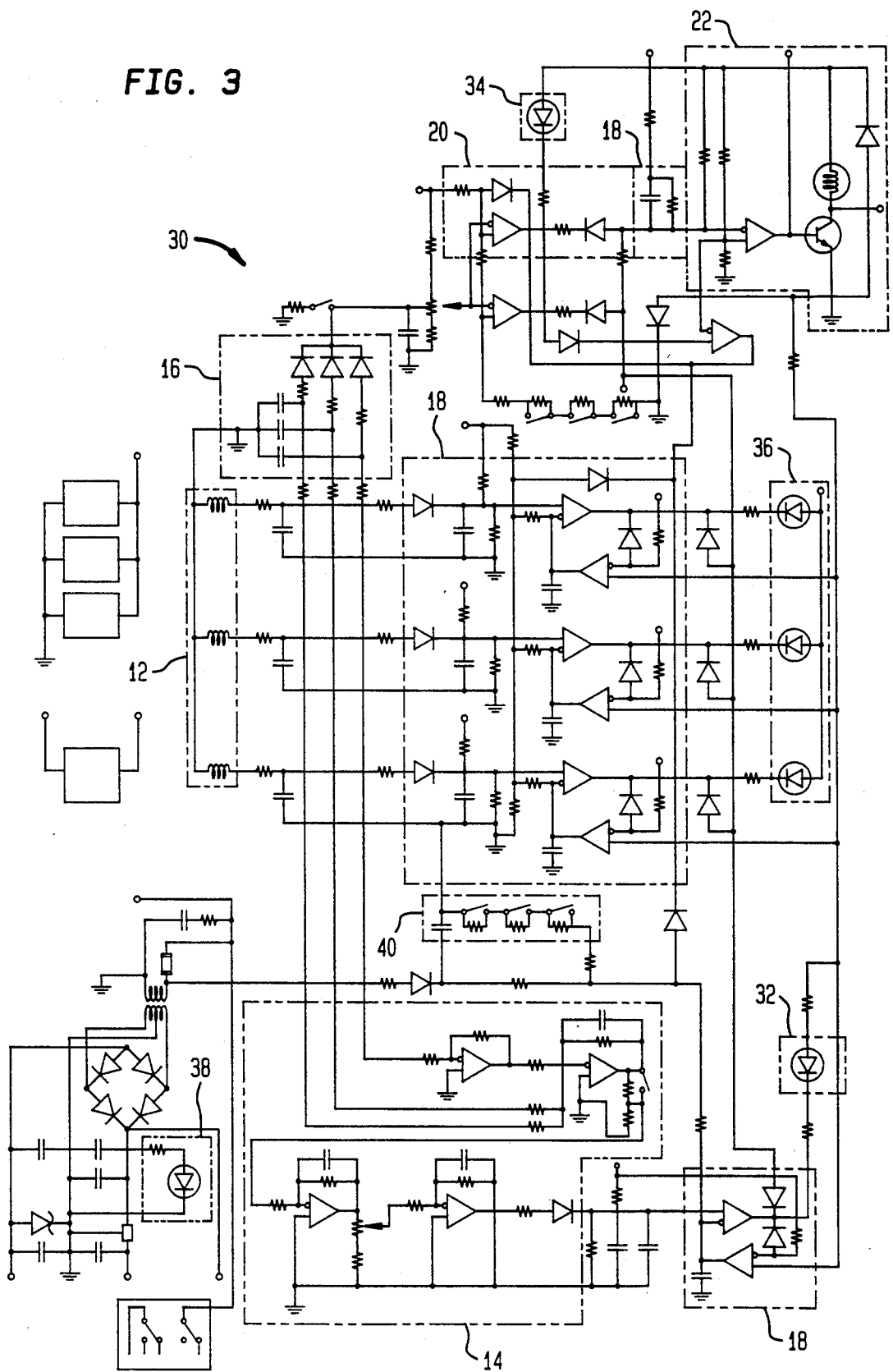
FIG. 3 illustrates a circuit diagram of a monitoring apparatus in accordance with the present invention.

The monitoring means preferably comprises two monitoring circuits. A first monitoring circuit 14 is filtered to permit monitoring of the fundamental frequency. Such a first monitoring circuit can detect the inoperation of individual capacitor cells in the filter. The second monitoring circuit monitors the harmonic frequencies detecting changes in the filter tuning, system resonance overcurrents, etc. All three phases are monitored permitting any significant differences between phases to be seen as faults. Such a fault signal would be sent to the timing means for interpretation. Monitor means 14 and 16 are shown in FIG. 3. Monitor means 14 uses an active filter to detect a malfunction of the filter's capacitor cells, while monitor means 16 uses a passive filter.

The timing means preferably includes two timing circuits (18, 20) which control the operation of a tripping means or disconnecting means 22 and indicator means 24. The first timing circuit 18 operates a time delay which permits the monitor to recheck any sensed out-of-parameter conditions before operating the tripping means 22. If the signal generated by sensing means 12 continues to be indicative of out-of-parameter conditions during the time delay, the timing circuit 18 operates tripping means 22 disconnecting the filter and/or electrical system and an indicator means 24 is enabled. Such an indicator means 24 may be a remote indicator means. As shown in FIG. 3, timing means 18 includes cross-coupled comparators to detect low voltage levels on the three lines, and a passive R−C circuit that sets the predetermined time delay so a blown fuse or an undercurrent level condition, for example, can be identified throughout the time delay. The predetermined time delay may vary depending on the type of power system and devices connected thereto, and the delay may preferably be in a range that includes, but is not limited to, delays between 10 and 20 seconds.

The second timing circuit 20 quickly operates the tripping means 22 and indicator means upon receipt of a signal which indicates dangerous or catastrophic conditions in the filter. As shown in FIG. 3, second timing means 20 includes circuitry to compare the current level in the filter to an internally-generated current level. If the current level exceeds this amount, indicating a dangerous level in the filter, tripping means 20 and indicator means 24 are activated to disconnect the filter from the system and to display the condition detected on front panel 50.

Figure 2:
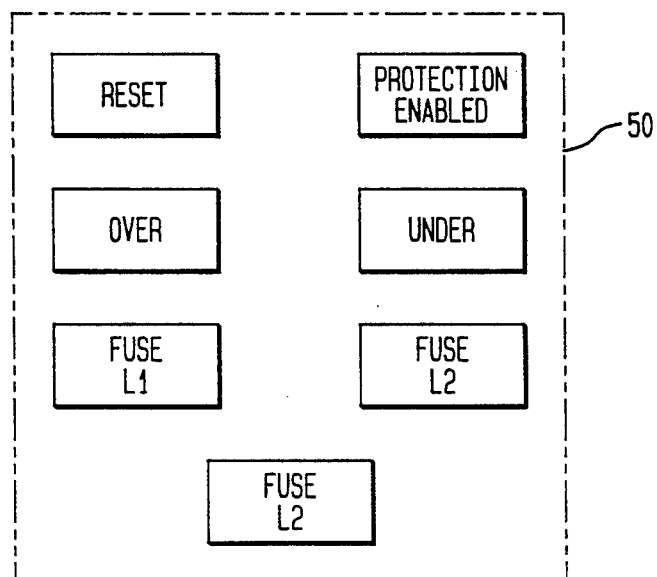
FIG. 2 illustrates a possible arrangement of the indicating means on the front panel of a monitoring apparatus in accordance with the present invention.

The indicator means 24 preferably includes, but is not limited to, means for signalling an overcurrent, an undercurrent and individual inoperative fuses. A reset switch and monitoring apparatus operation condition indicator may also be provided as shown in FIG. 2 on a possible arrangement of the front panel 50 of the monitoring apparatus.

FIG. 3 illustrates a circuit diagram of the monitoring apparatus 30. Indicator means 24 include undercurrent indicator 32, overcurrent indicator 34, blown fuse indicators 36 and protection enabled or monitor operation indicator 38.

In operation, should an electrical condition occur which potentially may damage the filter or the electrical system, the filter is removed from "on-line" and an indicator means 24 operated. The indicator means 24 preferably, but not necessarily, includes seven indicators. If a current exceeding the filter "rating" is sensed, the monitoring apparatus disconnects the filter and the respective indicator means is operated. A "reset" indicator means is additionally operated. In the event of a fuse blowing, the filter is disconnected, the "reset" indicator, "undercurrent" indicator operated and the respective "fuse" indicator is operated.

When the monitoring apparatus is powered and operating properly a "protection enabled" indicator is operated.

The resetting of the reset indicator means of the monitoring apparatus restores the filter to "on-line" status. If the potentially damaging condition is no longer occurring, the filter remains "on-line". However, if an "out-of-parameter" signal is again received, after 5–10 seconds the monitoring apparatus will remove the filter from on-line status indicating a continuing problem.

The remote indicating means 25 discussed previously may be an external alarm or a signal for an energy management computer.

An adjustment means 40 is provided in the monitoring apparatus allowing for any manufacturing tolerances.

Although there has been described what is at present considered to be preferred embodiments of the invention, it will be understood that various modifications and variations may be made therein, and it is intended to cover in the appended claims all such modifications as fall within the true spirit and scope of the invention. The invention illustratively disclosed herein suitably may be practiced in the absence of any element which is not specifically disclosed herein.

We claim:

1. A monitor used in detecting malfunctions of at least one tuned harmonic filter in an electrical system, comprising:

sensing means for obtaining a signal from the filter, representative of the electrical condition within the filter, and being connected to a coil of the filter for three-phase monitoring and comparison between phases;

at least two monitoring circuits, a first monitoring circuit for detecting volt-second product of the filter at a fundamental frequency and detecting changes in the filter thereby, and a second monitoring circuit for detecting volt-second product at harmonic frequencies and detecting changes in the filter thereby;

at least two timing circuits operatively connected to said two monitoring circuits, a first timing circuit for producing a signal when abnormal conditions are detected, and for delaying disconnection of the system to permit a rechecking of the abnormal conditions, and a second timing circuit for disconnecting the filter from the system when rapid operation of the disconnection is needed to prevent damage; and indicator means for signalling a particular condition in the filter;

said disconnection resulting in the filter being disconnected from the system and said indicator means being illuminated.

2. The monitor of claim 1, wherein:
    said indicator means includes a remote indicator means.

3. The monitor of claim 2, wherein:
    said monitoring circuits monitor power dissipation at different frequencies.

4. The monitor of claim 2, wherein:
    said indicator means provide diagnostic information.

5. The monitor of claim 2, wherein:
    said sensing means comprises at least one coil adapted to be wound on at least one tuning reactor in the filter.

6. The monitor of claim 5, wherein:
    said indicator means further includes at least one switch for resetting the operation of said monitor.

7. The monitor of claim 1, wherein:

said first timing circuit includes means for detecting an inoperable current condition in the filter.

8. The monitor of claim 1, wherein:
said first timing circuit further includes means for detecting a condition of a fuse in the filter.

9. The monitor of claim 1, wherein:
said first timing circuit detects an inoperable condition of capacitors located in the filter.

10. A monitor for tuned harmonic filter, said monitor continuously operating within defined parameters, said monitor disconnecting said filter from an electrical system before the filter or electrical system is damaged, said monitor comprising:
sensor means for generating a signal indicative of said filter actual operating condition;
monitoring means for comparing said signal and said defined parameters;
tripping means for disconnecting said filter from said electrical system when said monitoring means received a signal beyond said defined parameters.

11. An energy sensing monitor for use with a tuned harmonic filter that provides substantially distortion-free power to an electrical system, comprising:
sensing means operatively connected to the filter for obtaining a signal representative of electrical conditions of the filter;
monitoring means for comparing said signal with normal operating conditions of the filter connected with said sensing means, and comprising a first monitoring means detecting variations in the filter fundamental frequency, a second monitoring means detecting variations in the filter harmonic frequencies; and
timing means for activating a disconnect mechanism, said timing means providing a delay of said disconnect mechanism for said monitoring means to recheck said electrical conditions as compared to said normal operating conditions before said disconnect mechanism severs power to the filter, and said timing means rapidly activating said disconnect mechanism upon said monitoring means detection of filter actual conditions which could cause immediate damage to said electrical system.

12. The monitor of claim 11 wherein:
said monitor further includes indicator means for signalling a cause for the disconnection.

13. The monitor of claim 1, wherein:
said monitor further includes remote indicator means for signalling a disconnection of the filter.

14. The monitor of claim 12 wherein:
said indicator means includes warning lights indicating the condition of the filter.

15. The monitor of claim 14, wherein:
said sensing means comprises a coil wound on a tuning reactor in the filter.

16. The monitor of claim 14, wherein:
said indicator means includes at least one fuse-condition indicator.

17. The monitor of claim 14, wherein:
said monitoring means is sensitive to power dissipation in the filter.

18. The monitor of claim 14, wherein:
said warning lights also includes switches for resetting the monitor.

19. The monitor of claim 18, wherein:
the sensing means provides a three-phase overall effect of each harmonic frequency of said filter.

20. The monitor of claim 19, wherein:
said indicator means include a reset indicator and switch, a protection enabled indicator, a overcurrent indicator, a undercurrent indicator and fuse indicators.

* * * * *

UNITED STATES PATENT AND TRADEMARK OFFICE
CERTIFICATE OF CORRECTION

PATENT NO. : 5,319,513
DATED : June 7, 1994
INVENTOR(S) : Lowenstein et al.

It is certified that error appears in the above-indentified patent and that said Letters Patent is hereby corrected as shown below:

Column 6, line 10 (Claim 13, line 1), change "1," to --11,--.

Signed and Sealed this

Twenty-third Day of August, 1994

Attest:

BRUCE LEHMAN

*Attesting Officer*        *Commissioner of Patents and Trademarks*